Figure 1:
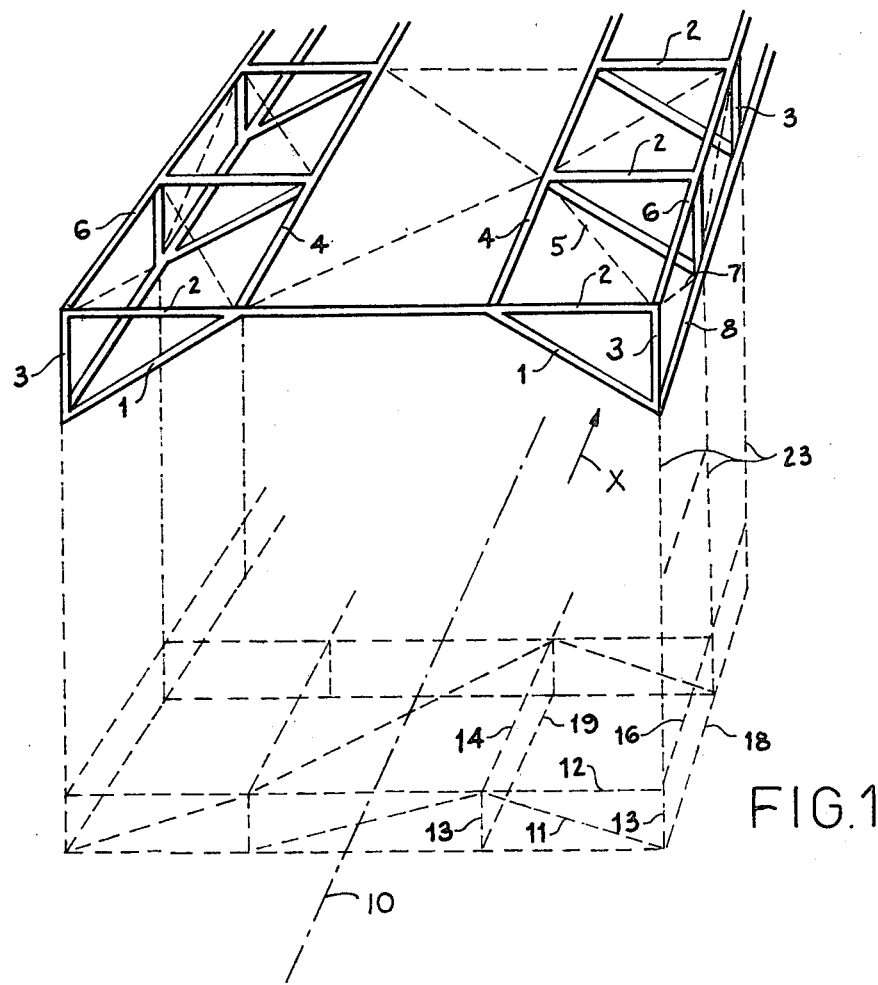

United States Patent [19]

Geyer

[11] 4,358,914

[45] Nov. 16, 1982

[54] BUS FRAME FOR A MOTOR BUS

[75] Inventor: Ludwig Geyer, Puchheim, Fed. Rep. of Germany

[73] Assignee: M.A.N. Maschinenfabrik Augsburg-Nurnberg A.G., Munich, Fed. Rep. of Germany

[21] Appl. No.: 186,066

[22] Filed: Sep. 11, 1980

[30] Foreign Application Priority Data

Sep. 11, 1979 [DE] Fed. Rep. of Germany ....... 2936708

[51] Int. Cl.³ .............................................. E04B 1/32
[52] U.S. Cl. ........................................ 52/643; 52/648; 296/178; 296/210
[58] Field of Search ................ 52/643, 648, 143, 79.1, 52/690, 693, 639; 296/178, 179, 210

[56] References Cited

U.S. PATENT DOCUMENTS 3,881,765  5/1975  Cerra et al. ........................ 296/178
3,913,286 10/1975  Boutacott ............................. 52/648
4,254,987  3/1981  Leonardis ........................... 296/178

*Primary Examiner*—Price C. Faw, Jr.
*Assistant Examiner*—Carl D. Friedman
*Attorney, Agent, or Firm*—Alan H. Levine

[57] ABSTRACT

A bus frame including a floor frame and a roof frame, the roof frame including a three-dimensional longitudinally continuous framework occupying at least a portion of the total roof frame width. The three-dimensional framework fits along the corners of the bus formed where the roof and side walls of the bus meet. The outer contour of the framework has the form of a triangular prism, one face of the prism coinciding with the bus roof, and another face coinciding with a bus side wall. The prism-shaped framework is defined in part by a series of triangular transverse members, each member being in a plane normal to the longitudinal centerline of the bus. The diagonally-oriented frame members, which face the interior of the bus, carry retaining elements for holding trim panels.

3 Claims, 2 Drawing Figures

BUS FRAME FOR A MOTOR BUS

This invention relates to a bus frame for a motor bus having a load-bearing floor frame.

In conventional motor buses, flexural rigidity about the transverse axis is achieved by means of side wall frames, on the one hand, said frames having the shape of flat tubular steel framework, and by means of the floor frame, on the other hand, which takes the shape of a three-dimensional framework. The need for maximum of flexural rigidity of the floor frame about the transverse axis of the bus, and at the same time for a minimum of weight, necessitates a certain minimum height of the floor frame. This height of the floor frame in turn governs the height of the bus floor above the road, so that considering the desirability of a maximally confortable boarding entrance step and, thus, for as low a boarding height as possible, the height of the floor frame should be minimized. This is a requirement in obvious conflict with that for maximum strength at low weight.

It is a broad object of the present invention to provide a bus frame which simultaneously satisfies three requirements, i.e., low weight, high flexural rigidity about a transverse axis of the vehicle, and small height of the floor frame.

It is a more particular object of the present invention to provide an arrangement wherein the bus roof comprises, for at least part of its total width, a longitudinally continuous, three-dimensional framework.

Unlike conventional bus frames, where the roof is simply formed by a plane framework, the arrangement of the present invention provides an advantage in that a major portion of the requisite resistance of the bus frame to bending about a transverse axis of the vehicle is contributed by the roof structure. This permits the floor frame to be designed for a correspondingly reduced amount of resistance to bending about a transverse axis of the vehicle, and the requirement for the low height and, thus, moderate boarding height of the bus, to be satisfied.

In a preferred embodiment of the present invention a longitudinal beam formed from a three-dimensional framework is integrated in the area of the corners formed by the side walls and the roof plane of the bus. The disposition of the three-dimensional framework in the corners formed by the roof and the side walls provides an advantage, especially for the economy it gives in terms of space, considering that it will not reduce the head room in the central area of the bus, where buses normally have an isle. This arrangement provides an additional advantage in that the corners formed between the roof and the side walls are stiffened considerably to improve the torsional rigidity of the bus frame. Concerning space inside the bus, it will be a special benefit to give the longitudinal beam the shape of a triangular prism, wherein one face coincides with the roof plane, a second face with the side wall of the bus, and the third diagonally oriented face of the prism is formed by frame members extending in planes normal to the longitudinal axis of the bus. This enables the space between two adjacent, diagonally oriented frame members to be used for luggage racks or other installations.

In a preferred embodiment of the present invention, the diagonally oriented frame members are fitted on the side facing the interior of the bus, with retaining shapes provided for trim panels. To these retaining shapes, trim panels can be bolted or engaged in suitably contoured slots to make the interior of the triangular prism, as defined by the frame members, a closed-off cavity to be used, e.g., as an air duct.

Figure 2:
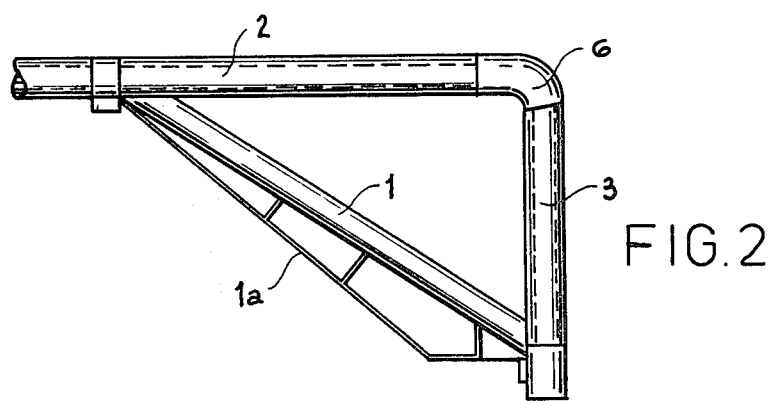

An illustrative embodiment of the present invention is described more fully with reference to the accompanying drawings, in which:

FIG. 1 is a fragmentary schematic perspective view of a bus frame sectioned at right angles to the longitudinal axis of the vehicle; and FIG. 2 is a fragmentary elevational view of a corner portion between the bus roof and side wall, looking in the direction of arrow X of FIG. 1.

In the bus frame schematically illustrated in FIG. 1, it is only the significant frame members of the roof portion which, for clarity of presentation, are shown in double outline, whereas all other frame members of the bus frame are shown in broken lines. Extending parallel to the longitudinal axis 10 of the bus frame are the longitudinal braces 14, 16, 18 and 19 of the floor frame. The height of the floor frame is indicated by the length of the vertical frame members 13. A diagonal frame member 11 extends between the longitudinal brace 14 and the longitudinal brace 18.

Connection between the floor frame and the roof portion is essentially established by vertical frame members 23, which, although this is not detailed on the drawing, are stiffened by diagonal members, making the side walls of the frame a flat framework construction.

An essential element of the roof portion is formed by the prismatic longitudinal beams arranged in the area of the corners formed between the side walls and the roof plane, together with the longitudinal braces 4, 6, 8 and the transverse members 1, 2, 3. The longitudinal brace 6 forms the edge between the roof plane and the side wall of the bus frame. The transverse members 1, 2, 3, including the diagonally oriented frame member 1, extend in planes each of which is normal to the longitudinal axis of the bus 10. In order to stiffen the prismatic longitudinal beam, diagonal braces 5 are used in the roof plane between the frame members 2, and diagonal braces 7 are used in the side wall plane between the frame members 3.

The fragmentary view shown in FIG. 2 illustrates the contour of the prismatic longitudinal beam, the contour being defined by the transverse members 1, 2, 3. On that side of the frame member 1 which faces the interior of the bus, a retaining element 1a is fitted and preferably welded to the frame member 1. The frame member 1 preferably has a square, tubular shape, and the retaining element serves to attach trim panels to close off the prismatic cavity from the interior of the vehicle.

It is contemplated that the prismatic longitudinal beams can be replaced by frames of other shapes, such as longitudinal beams of rectangular tubular section, to augment the resistance the roof portion of a bus frame affords to bending. Ultimately the entire roof portion can be designed, much as the floor frame, as a three-dimensional framework of approximately rectangular contour.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A bus frame for a motor bus comprising a floor frame and a roof frame spaced above the floor frame, the roof frame including a three-dimensional longitudinally continuous framework occupying at least a portion of the total roof frame width, the three-dimensional framework fitting along the corners of the bus formed where the roof and side walls of the bus meet, and the outer contour of the three-dimensional framework having the form of a triangular prism, one face of the prism coinciding with the bus roof and another face of the prism coinciding with a bus side wall.

2. A bus frame as defined in claim 1 wherein the third face of the prism is diagonally oriented and all three faces of the prism are defined in part by a series of triangular transverse members, each transverse member being in a plane normal to the longitudinal centerline of the bus.

3. A bus frame as defined in claim 2 wherein the diagonally oriented frame members defining the third face of the prism face the interior of the bus and carry retaining elements for holding trim panels.

* * * * *